(12) United States Patent
Langenfeld et al.

(10) Patent No.: US 11,215,275 B1
(45) Date of Patent: Jan. 4, 2022

(54) FLUID EXPANSION TANK

(71) Applicant: Hydro-Gear Limited Partnership, Sullivan, IL (US)

(72) Inventors: Thomas J. Langenfeld, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 101 days.

(21) Appl. No.: 16/659,059

(22) Filed: Oct. 21, 2019

Related U.S. Application Data

(63) Continuation of application No. 15/347,136, filed on Nov. 9, 2016, now Pat. No. 10,451,171.

(60) Provisional application No. 62/253,978, filed on Nov. 11, 2015.

(51) Int. Cl.
*F16H 57/04* (2010.01)
*F16H 1/22* (2006.01)

(52) U.S. Cl.
CPC ............ *F16H 57/045* (2013.01); *F16H 1/22* (2013.01); *F16H 57/0441* (2013.01); *F16H 57/0457* (2013.01)

(58) Field of Classification Search
CPC ...... F16H 57/045; F16H 1/22; F16H 57/0441; F16H 57/0457
USPC ........................................................ 74/665 F
See application file for complete search history.

(56) References Cited

U.S. PATENT DOCUMENTS

| | | |
|---|---|---|
| 1,840,874 A | 1/1932 | Rayburn |
| 2,195,877 A | 4/1940 | Steedman |
| 2,413,162 A | 12/1946 | Ackerman |
| 2,474,706 A | 6/1949 | Wahlmark |
| 3,087,734 A | 4/1963 | Klingler |
| 3,654,761 A | 4/1972 | Eickmann |
| 3,941,149 A | 3/1976 | Mittleman |
| 3,969,876 A | 7/1976 | Turos |
| 4,468,981 A | 9/1984 | Ries |
| 4,700,808 A | 10/1987 | Haentjens |
| 4,791,824 A | 12/1988 | Adam-Nicolau |
| 4,889,621 A | 12/1989 | Yamada et al. |
| 4,900,233 A | 2/1990 | Ripley |
| 4,979,583 A | 12/1990 | Thoma et al. |
| 4,987,796 A | 1/1991 | von Kaler et al. |
| 5,090,949 A | 2/1992 | Thoma et al. |
| 5,201,692 A | 4/1993 | Johnson et al. |

(Continued)

FOREIGN PATENT DOCUMENTS

| | | |
|---|---|---|
| EP | 3219242 | 9/2017 |
| JP | 3159822 | 7/1991 |

OTHER PUBLICATIONS

Photograph dated Mar. 4, 1996 of Model 310-3000 Integrated Hydrostatic Transaxle.
U.S. Appl. No. 15/846,866, filed Dec. 19, 2017, 54 pp.

*Primary Examiner* — Ha Dinh Ho

(74) *Attorney, Agent, or Firm* — Neal, Gerber & Eisenberg LLP

(57) ABSTRACT

A hydraulic fluid expansion tank is located inside a housing of a drive device. The expansion tank comprises a siphon tube in communication with a sump located within the drive device and also comprises a vent opening in communication with a vent of the drive device that is in communication with atmospheric pressure. The fluid expansion tank is positioned and restrained within the drive device without the use of fasteners.

20 Claims, 12 Drawing Sheets

(56) References Cited

U.S. PATENT DOCUMENTS

| | | | |
|---|---|---|---|
| 5,236,061 A | 8/1993 | Haupt | |
| 5,259,194 A | 11/1993 | Okada | |
| 5,314,387 A | 5/1994 | Hauser et al. | |
| 5,373,697 A | 12/1994 | Jolliff et al. | |
| 5,394,699 A | 3/1995 | Matsufuji | |
| 5,515,747 A | 5/1996 | Okada et al. | |
| 5,555,727 A | 9/1996 | Hauser et al. | |
| 5,613,409 A | 3/1997 | Hauser | |
| 5,616,092 A | 4/1997 | Hauser et al. | |
| 5,622,051 A | 4/1997 | Iida et al. | |
| 5,626,204 A | 5/1997 | Johnson | |
| 5,644,954 A | 7/1997 | Matsufuji | |
| 5,709,084 A | 1/1998 | Krantz | |
| 5,802,851 A | 9/1998 | Krantz | |
| 5,839,327 A | 11/1998 | Gage | |
| 5,957,229 A | 9/1999 | Ishii | |
| 6,073,443 A | 6/2000 | Okada et al. | |
| 6,122,996 A | 9/2000 | Hauser et al. | |
| 6,152,247 A | 11/2000 | Sporrer et al. | |
| 6,185,936 B1 | 2/2001 | Hauser et al. | |
| 6,233,929 B1 | 5/2001 | Okada et al. | |
| 6,280,613 B1 | 8/2001 | Morse et al. | |
| 6,341,489 B1 | 1/2002 | Iida | |
| 6,354,975 B1 | 3/2002 | Thoma | |
| 6,401,568 B1 | 6/2002 | Hauser et al. | |
| 6,401,869 B1 | 6/2002 | Iida et al. | |
| 6,622,825 B2 | 9/2003 | Iida et al. | |
| 6,626,065 B2 * | 9/2003 | Arnold | B60K 17/105 475/72 |
| 6,637,293 B1 | 10/2003 | Hauser et al. | |
| 6,662,825 B2 | 12/2003 | Frank et al. | |
| 6,698,198 B1 * | 3/2004 | Schreier | F16H 57/02 60/487 |
| 6,745,565 B1 * | 6/2004 | Wahner | F15B 1/26 220/367.1 |
| 6,843,747 B1 | 1/2005 | Phanco et al. | |
| 6,986,406 B1 * | 1/2006 | Hauser | B60K 17/105 184/6.28 |
| 7,047,736 B1 | 5/2006 | Langenfeld et al. | |
| 7,052,429 B1 | 5/2006 | Phanco et al. | |
| 7,073,330 B1 | 7/2006 | Hauser | |
| 7,210,294 B1 | 5/2007 | Langenfeld | |
| 7,845,361 B1 | 12/2010 | Verespej et al. | |
| 7,926,266 B1 | 4/2011 | Wigness et al. | |
| 7,926,624 B1 | 4/2011 | Taylor | |
| 7,963,529 B2 | 6/2011 | Oteman et al. | |
| 8,028,520 B1 | 10/2011 | Rawski | |
| 8,418,452 B1 | 4/2013 | Phanco et al. | |
| 8,464,610 B1 | 6/2013 | Langenfeld et al. | |
| 8,826,774 B1 | 9/2014 | Craig | |
| 8,844,658 B2 | 9/2014 | Wyatt et al. | |
| 8,931,268 B1 | 1/2015 | Langenfeld | |
| 9,856,969 B1 | 1/2018 | Niemerg | |
| 10,451,171 B1 | 10/2019 | Langenfeld et al. | |
| 10,557,544 B1 | 2/2020 | Phanco et al. | |
| 2002/0115521 A1 | 8/2002 | Thoma | |
| 2016/0003336 A1 | 1/2016 | Crosby et al. | |

* cited by examiner

FLUID EXPANSION TANK

CROSS REFERENCE

This application is a continuation of U.S. patent application Ser. No. 15/347,136, filed on Nov. 9, 2016, which claims the benefit of U.S. Provisional Patent App. No. 62/253,978, filed on Nov. 11, 2015, both of which are incorporated herein in their entirety.

BACKGROUND OF THE INVENTION

This application is related to drive devices for a variety of vehicles, including walk-behind vehicles such as snow throwers. A hydraulic fluid expansion tank is often associated with these drive devices and is often located external to the housings of these drive devices. There exists an opportunity for improvement of this arrangement by locating the fluid expansion tank inside a housing of the drive device to prevent damage to the expansion tank, conserve space, reduce oil volume, eliminate components such as external fluid lines and fittings that are also susceptible to damage, reduce weight and reduce cost.

SUMMARY OF THE INVENTION

The present invention provides an improved hydraulic fluid expansion tank located inside a housing of a drive device, which may be used in a variety of vehicle or other applications.

A better understanding of the properties of the invention will be obtained from the following detailed description and accompanying drawings which set forth one or more illustrative embodiments and are indicative of the various ways in which the invention may be employed.

DETAILED DESCRIPTION OF THE DRAWINGS

Figure 1:
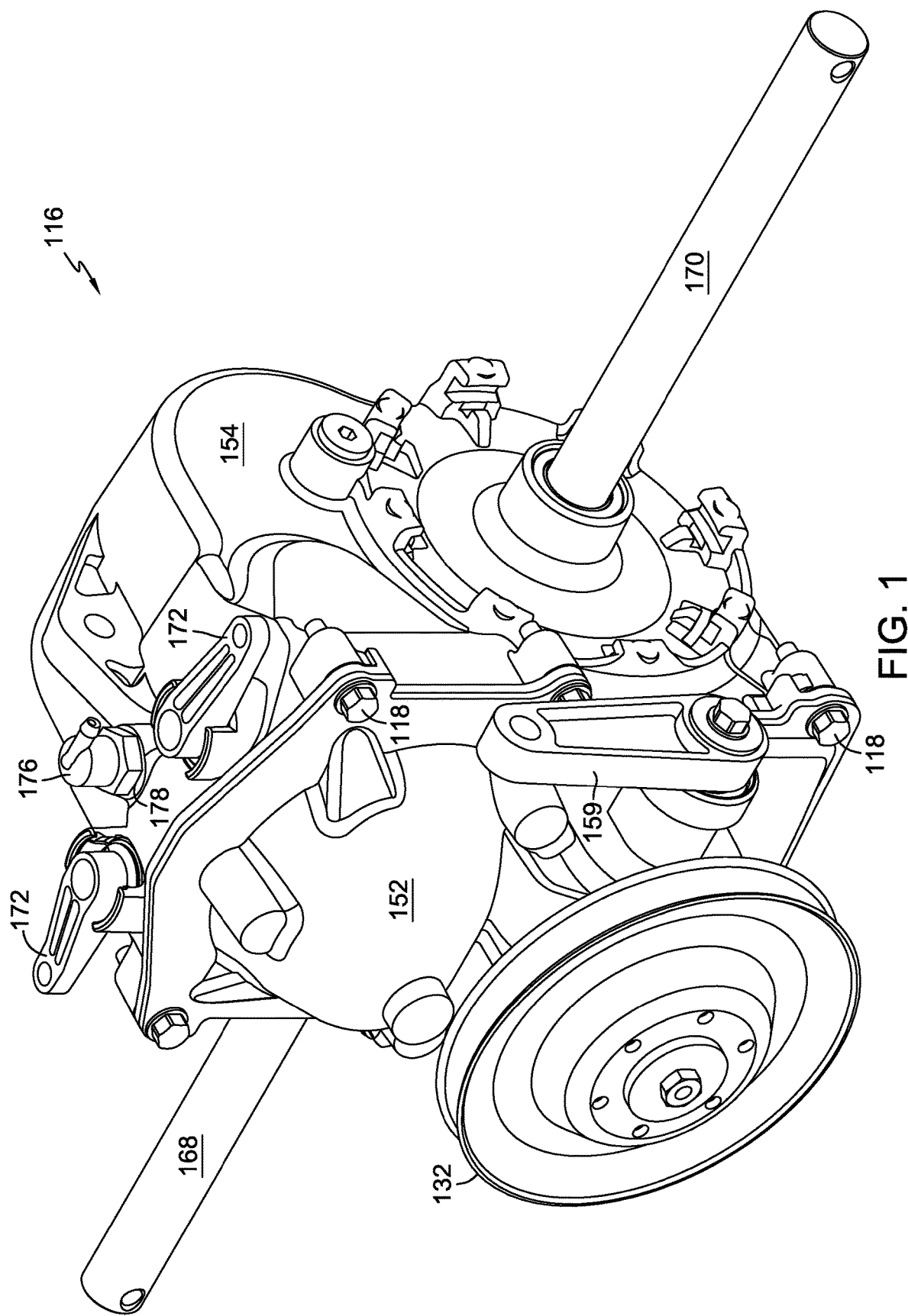
FIG. 1 is a perspective view of an exemplary hydraulic drive device.
Figure 2:
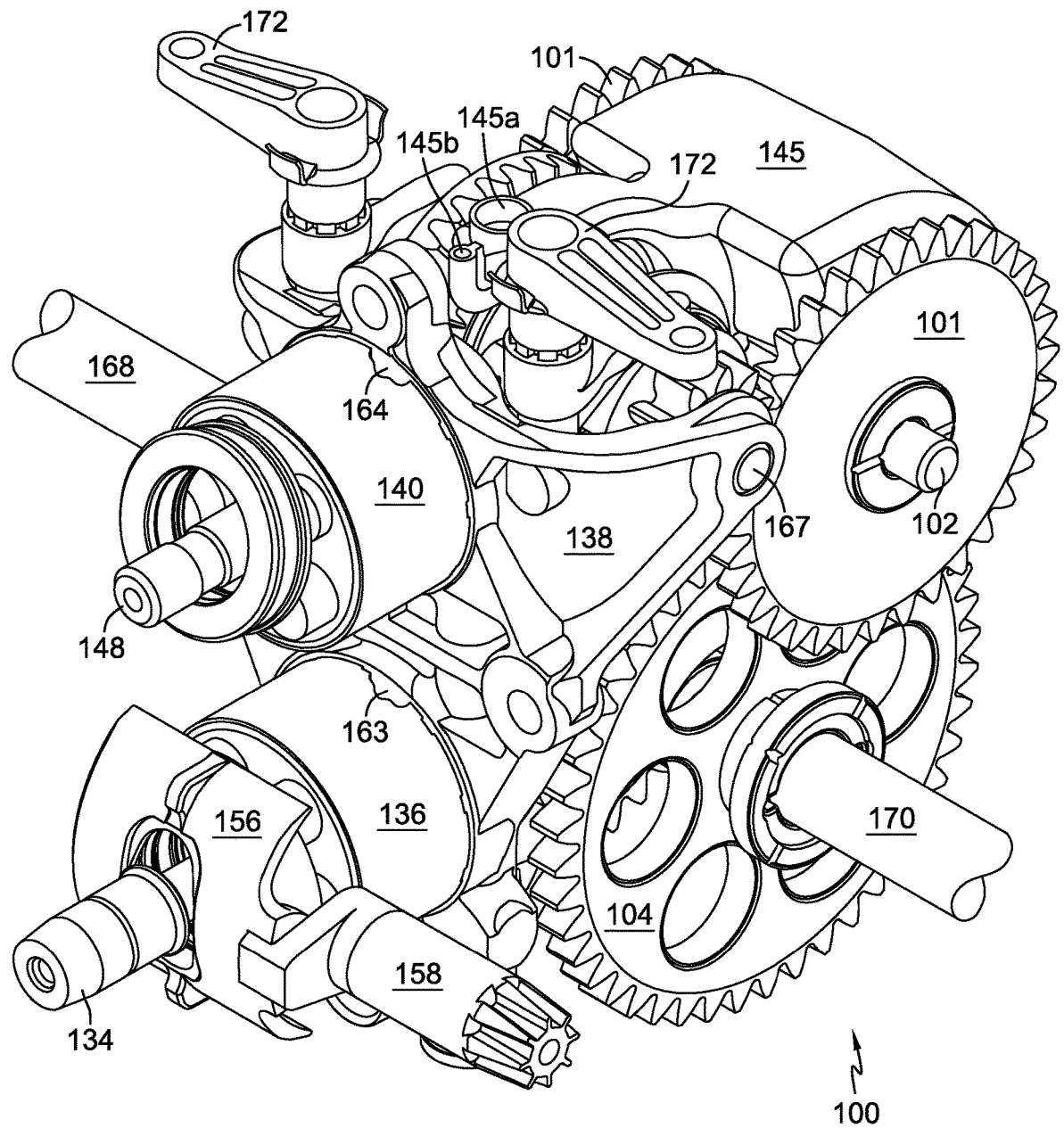
FIG. 2 is a perspective view of the hydraulic drive device shown in FIG. 1 with the housings and certain other items removed.
Figure 3:
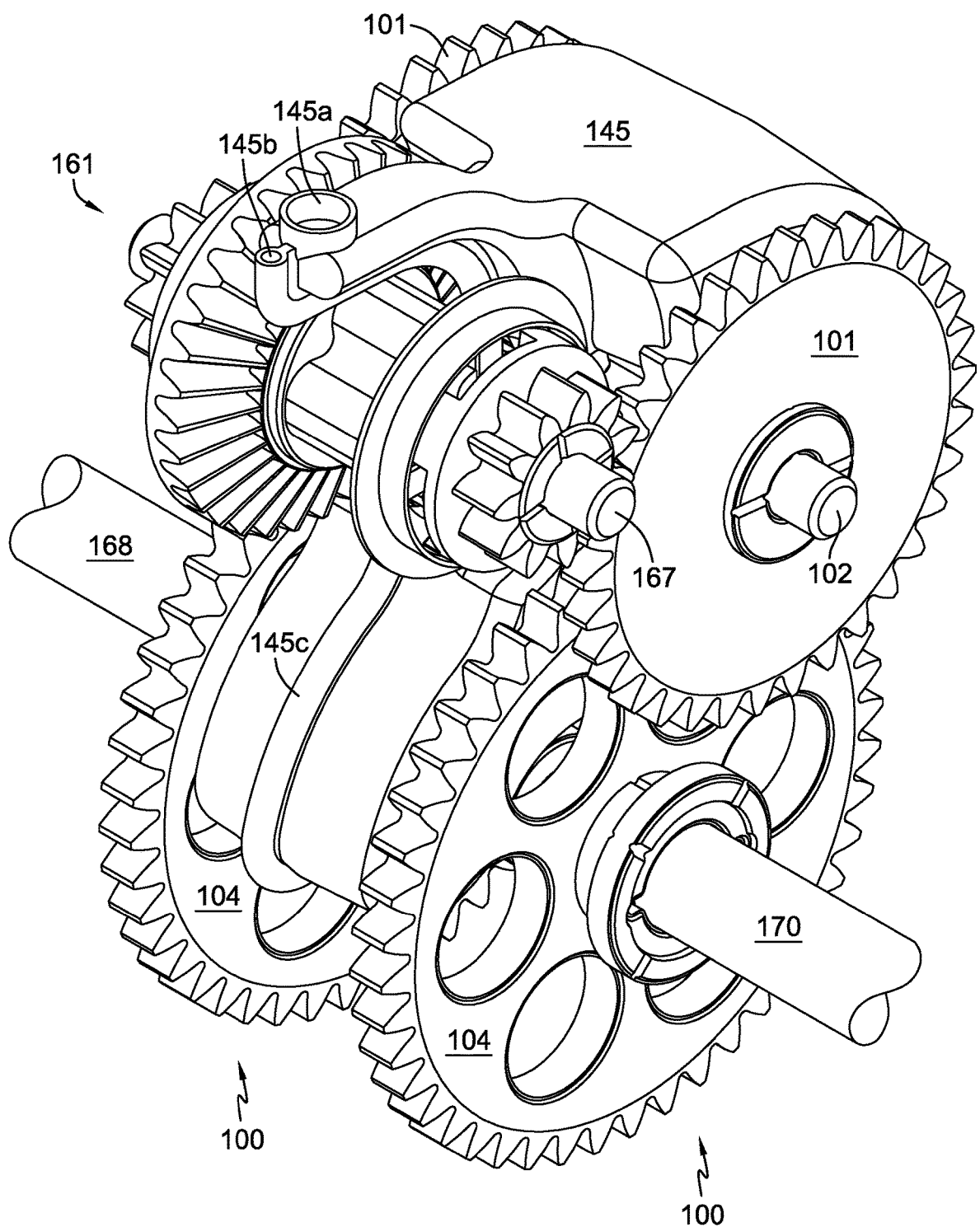
FIG. 3 is a perspective view of the portion of the hydraulic drive device shown in FIG. 2 with certain items removed for clarity.
Figure 4:
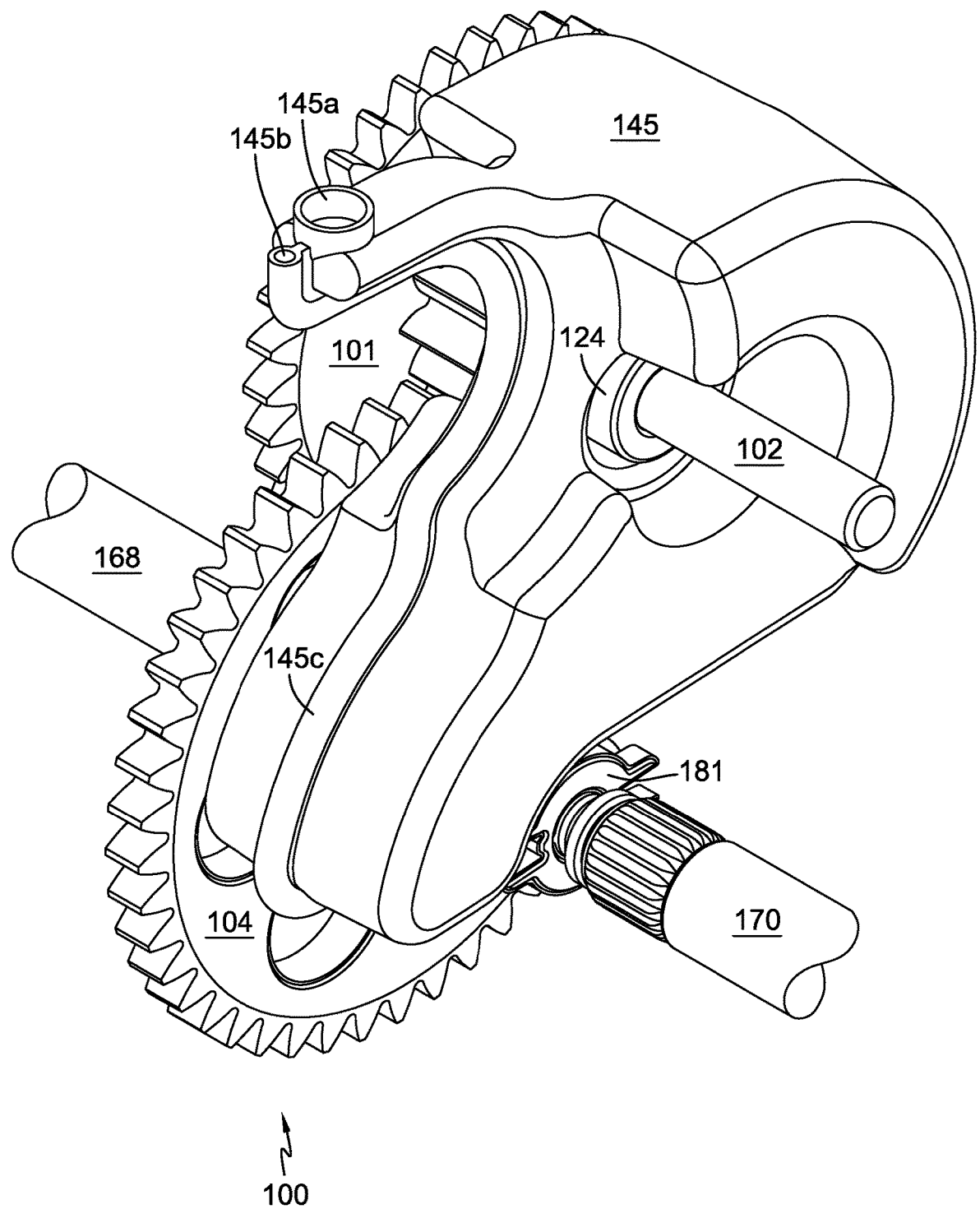
FIG. 4 is a perspective view of the portion of the hydraulic drive device shown in FIG. 3 with certain additional items removed for clarity.
Figure 5:
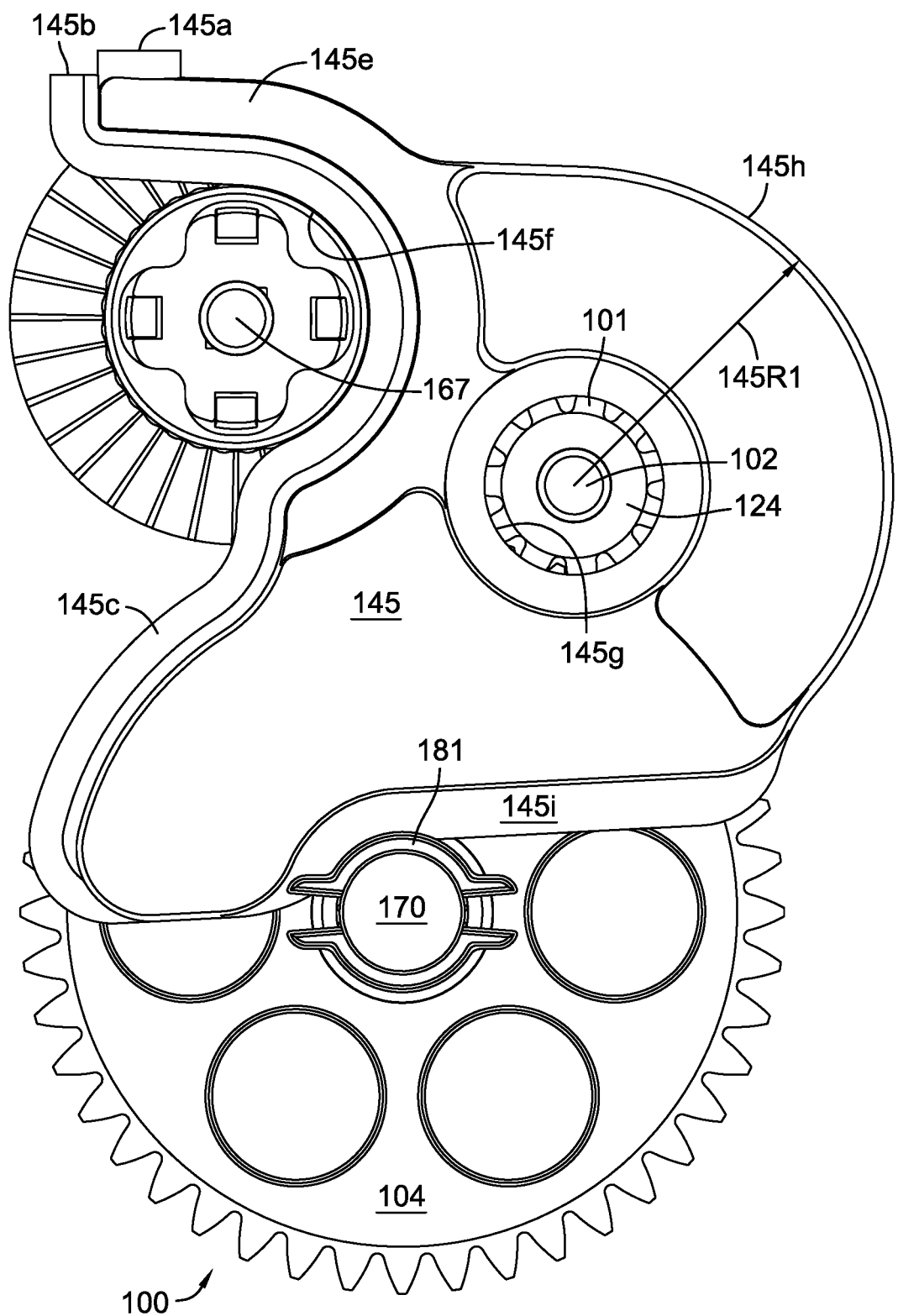
FIG. 5 is an elevational view of the portion of the hydraulic drive device shown in FIG. 3 with certain additional items removed for clarity.

The description that follows describes, illustrates and exemplifies one or more particular embodiments of the present invention in accordance with its principles. This description is not provided to limit the invention to the embodiment(s) described herein, but rather to explain and teach the principles of the invention in such a way to enable one of ordinary skill in the art to understand these principles and, with that understanding, be able to apply them to practice not only the embodiment(s) described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing or serial numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. The present specification is intended to be taken as a whole and interpreted in accordance with the principles of the present invention as taught herein and understood by one of ordinary skill in the art.

The embodiment(s) of the drive device(s) disclosed herein may be used in a variety of vehicles such as a walk-behind snow thrower or other such vehicles. However, the embodiment(s) disclosed herein are not limited to use in this type of vehicle.

An exemplary drive device 116 is depicted in FIGS. 1-8. Drive device 116 is shown as a type of continuously variable hydraulic or hydrostatic transmission of a type known as an integrated hydrostatic transaxle. Such transmissions and transaxles are well known in the art and will only generally be described herein, and the structure of drive device 116 is similar in many respects to that shown in commonly owned U.S. Pat. No. 8,464,610, the disclosure of which is incorporated herein by reference in its entirety.

Drive device 116 is powered by a prime mover (not shown), that, in the depicted embodiment, drives the input shaft 134 by way of a belt and pulley system. For convenience, only pulley 132 of the belt and pulley system is shown. Input shaft 134 is engaged to and drives the hydraulic pump 136, which is rotatably disposed on a pump mounting surface 163 on center section 138, which acts as a hydraulic mounting member. Motor 140 is also rotatably disposed on a motor mounting surface 164 on center section 138, and in this embodiment pump 136 and motor 140 are disposed on the same side of center section 138. The mounting surfaces referred to herein may also be referred to as running surfaces, and may include a valve plate. Hydraulic pump 136 is hydraulically connected to motor 140 through internal hydraulic porting (not shown) formed in center section 138. Center section 138 is supported in an internal sump 120 formed by internal wall structures of a housing formed by joining a first housing member 152 and a second housing member 154 via fasteners 118.

A swash plate such as swash plate 156 is provided to control the displacement of pump 136. As swash plate 156 is moved by trunnion arm 158, the displacement of pump 136 changes, thereby causing motor 140 to rotate at a speed and direction determined by the swash plate position. Trunnion arm 158 may be moved manually by a control arm 159 or by an electronic or hydraulic control, as is known in the art. Examples of electronic controls that could be used in connection with the present invention may be found in commonly-owned U.S. Pat. Nos. 7,073,330 and 8,844,658, and the disclosures of both these patents are incorporated herein by reference in their entireties.

Motor 140 drives output shaft 148, which drives the clutch assembly 161 by way of a pinion gear (not shown) mounted on and driven by output shaft 148. The outputs of axle shafts 168 and 170 are modified by selective engagement of clutch assembly 161, resulting in steering of the vehicle in which drive device 116 is used. Clutch assembly 161 is engaged to a pair of reduction gear sets 100. Each reduction gear set 100 includes a reduction spur gear 101 and a spur gear 104. Each spur gear 104 is mounted on and drives one of axle shaft 168 or 170. Jack shaft 102 is supported in second housing member 154 and supports the pair of reduction spur gears 101. A spacer 124, also supported on jack shaft 102, separates and ensures proper positioning of reduction spur gears 101, which are combination spur gears. Such features specific to the transaxle 116 and control of its output are shown in detail in the previously incorporated U.S. Pat. No. 8,464,610.

The pump input shaft 134, motor output shaft 148 and clutch actuator arms 172 are all partially supported by center section 138. Clutch assembly 161 is entirely supported on shaft 167 which is supported by center section 138. Fasteners (not shown) secure center section 138 to first housing member 152.

Figure 6:
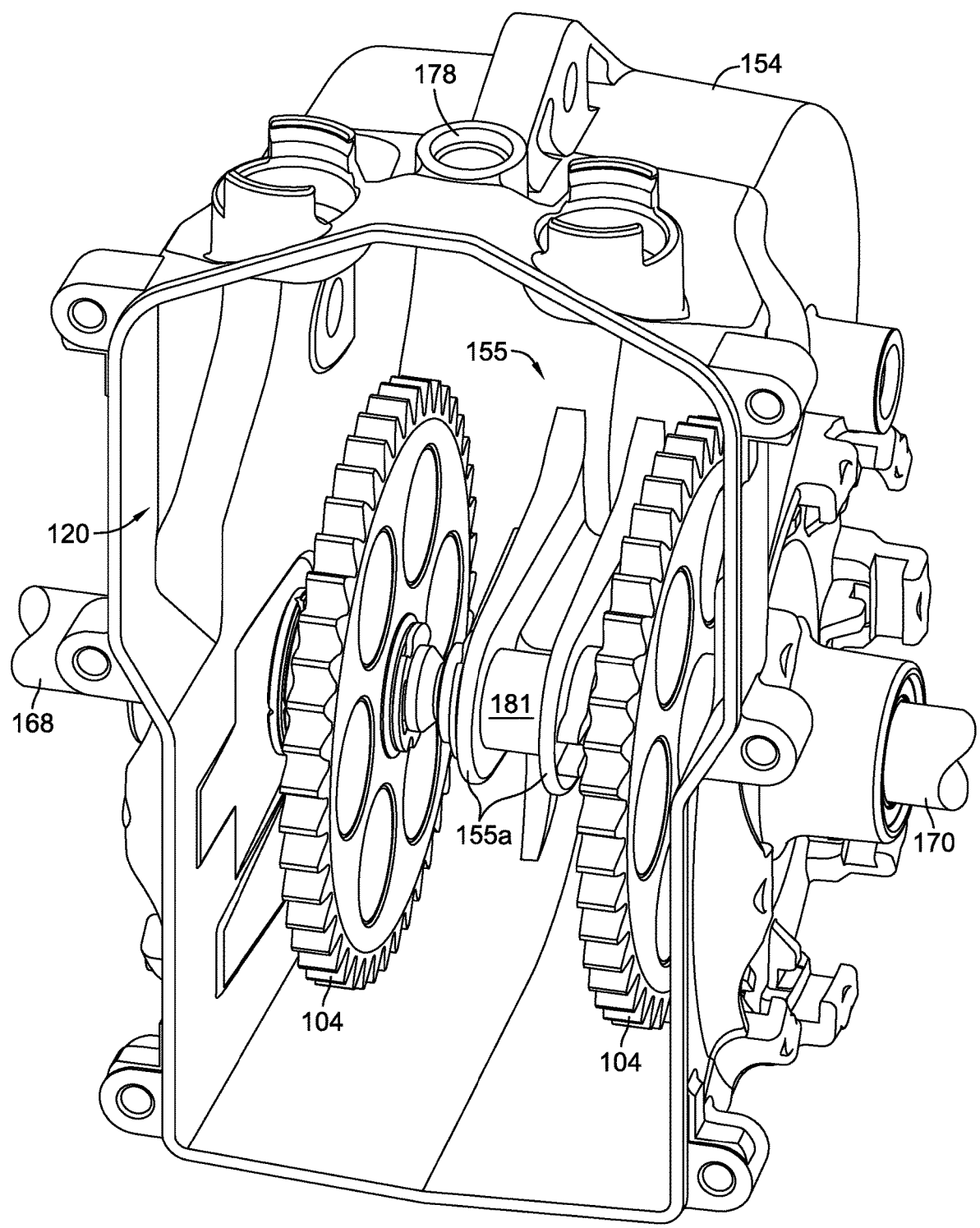
FIG. 6 is a perspective view of a portion of the hydraulic drive device shown in FIG. 1.
Figure 7:
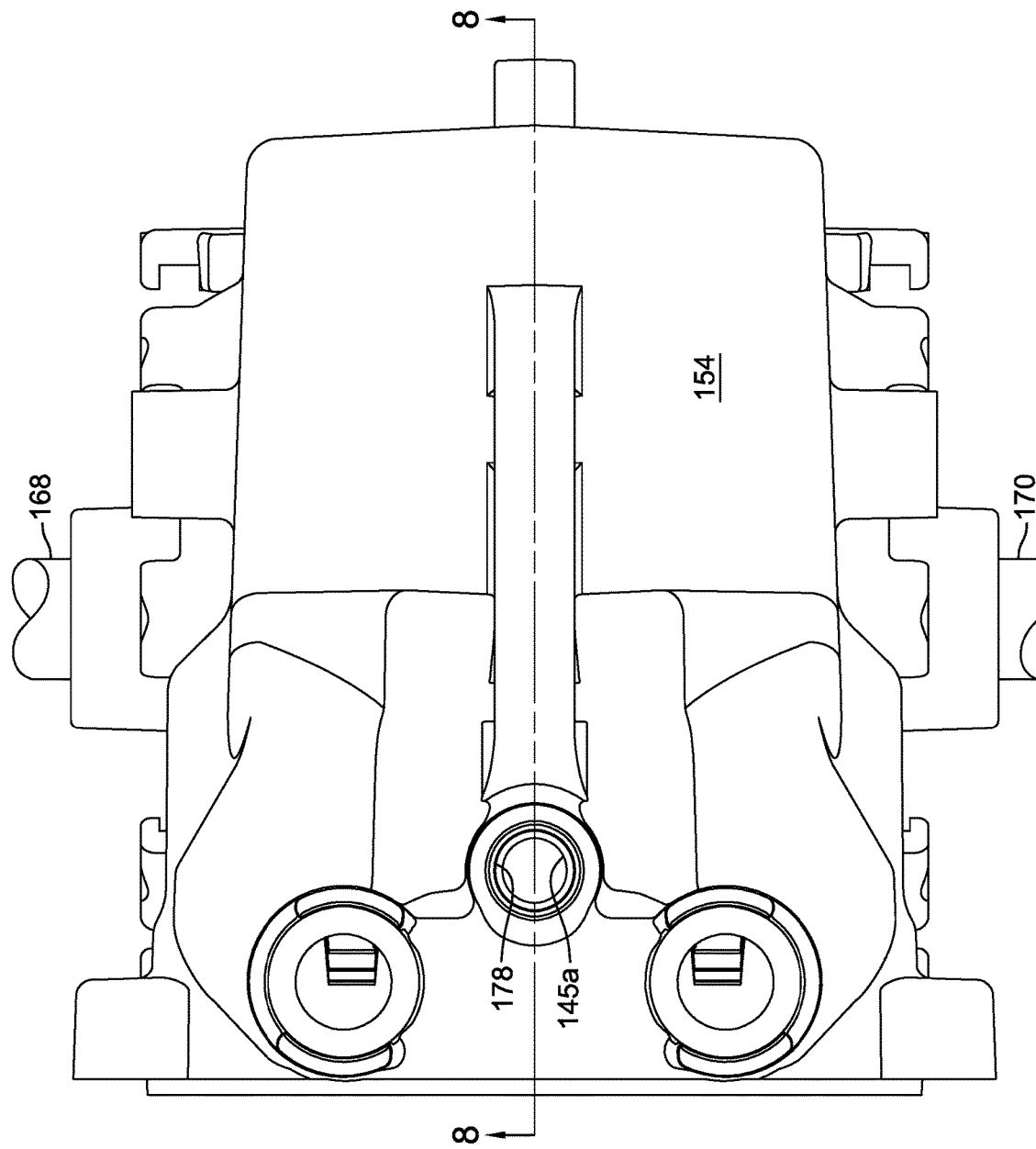
FIG. 7 is a top plan view of a housing element containing the portion of the hydraulic drive device shown in FIG. 3, with certain clutch components removed to improve clarity in the section view FIG. 8.
Figure 8:
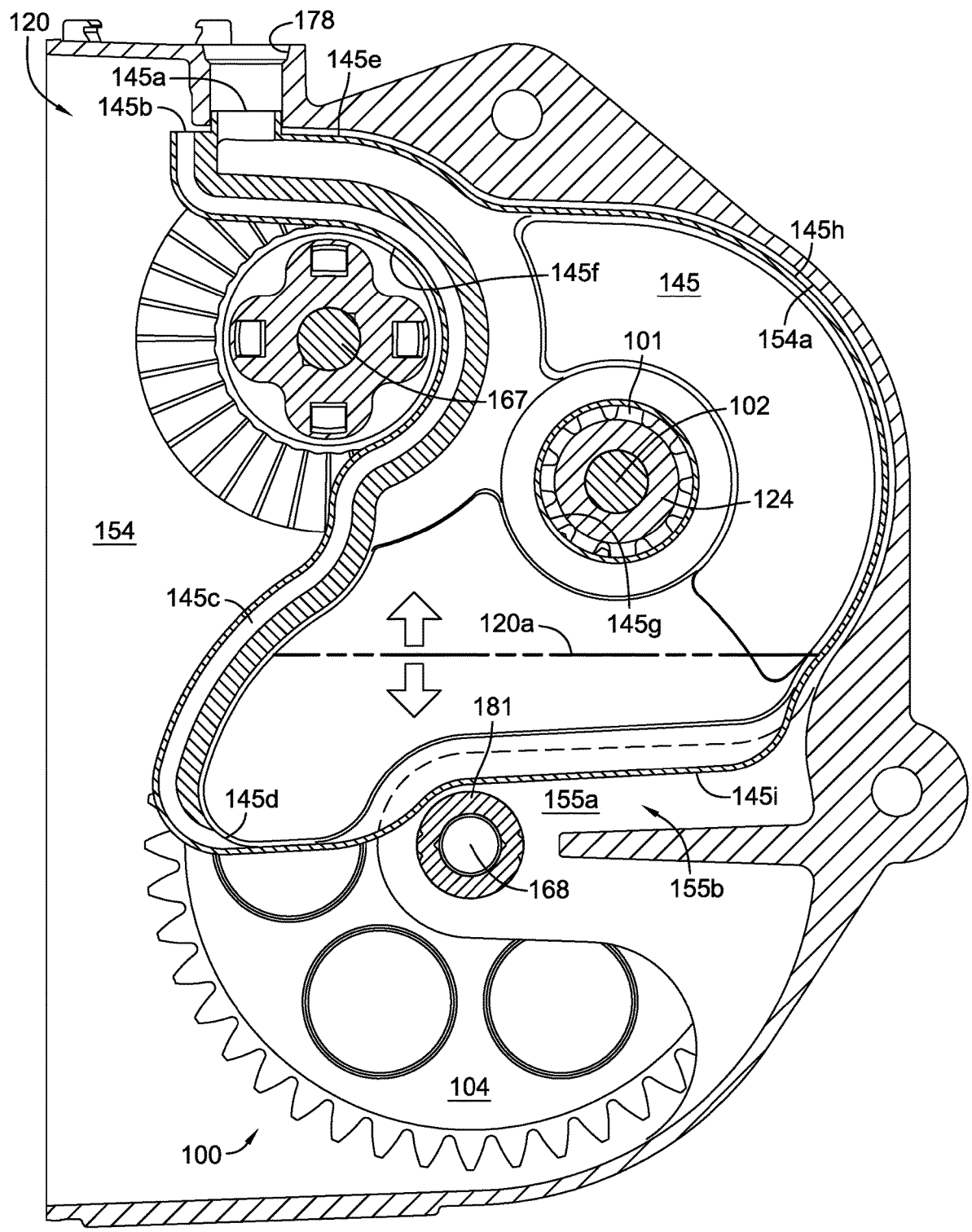
FIG. 8 is a cross-sectional view of the portion of the hydraulic drive device shown in FIG. 7 along the line 8-8.

As shown in FIG. 6, second housing member 154 includes an axle support structure 155 centrally located within second housing member 154 and having a pair of lobes 155*a* to receive an axle support bushing 181 in which the inner ends of axle shafts 168, 170 are supported. Spur gears 104 are located to either side of axle support structure 155 so there is significant space separating the spur gears 104. Additional details on this structure may be seen in commonly-owned U.S. patent application Ser. No. 14/690,665, the disclosure of which is incorporated herein by reference, and which is now U.S. Pat. No. 9,856,969.

Expansion tank 145 is preferably composed of a synthetic polymer (plastic) that can withstand the internal operating environment of drive device 116, and expansion tank 145 is capable of receiving the hydraulic fluid from, and discharging hydraulic fluid to, internal sump 120. In the depicted embodiments, at least one gear of the drive device or transmission 116 is disposed adjacent to one of a plurality of internal walls of the housing, and an expansion tank 145 is disposed in the internal sump 120 and separate from the housing, wherein at least one gear is disposed between expansion tank 145 and at least one of the internal walls. More specifically, as shown in, e.g., FIGS. 3-5 and 8, expansion tank 145 is nested in the space between the pair of reduction gear sets 100 with tank outer profile 145*h* of a portion of tank 145 closely following inner profile 154*a* of second housing member 154 to help position and limit movement of tank 145. As illustrated, a small gap may exist between tank outer profile 145*h* and inner profile 154*a*. Optionally, these profiles or a portion thereof may be nominally the same to help restrain tank 145. It can also be seen in, e.g., FIGS. 2, 3 and 5, that spur gears 101 share a common radius, and that the portion of expansion tank 145 having outer profile 145*h* has a radius 145R1 that is greater than the root radius of spur gears 101, to maximize the size of tank 145. A rib 145*i* is located in close proximity to bushing 181 between the pair of lobes 155*a* to further aid in positioning tank 145 and limiting movement to prevent contact of tank 145 with components of reduction gear sets 100.

A portion of expansion tank 145 also has what may be called a transverse passage or clearance opening 145*g* formed therein, to permit one of the shafts of drive device 116 to pass therethrough in order to decrease the overall size of the unit. In the depicted embodiment, transverse passage 145*g* is similar in form to a "doughnut hole," and jack shaft 102 passes through passage 145*g* of tank 145 such that spacer 124 is located within passage 145*g*, and a portion of the internal volume of expansion tank 145 fully surrounds passage 145*g*.

Figure 12:
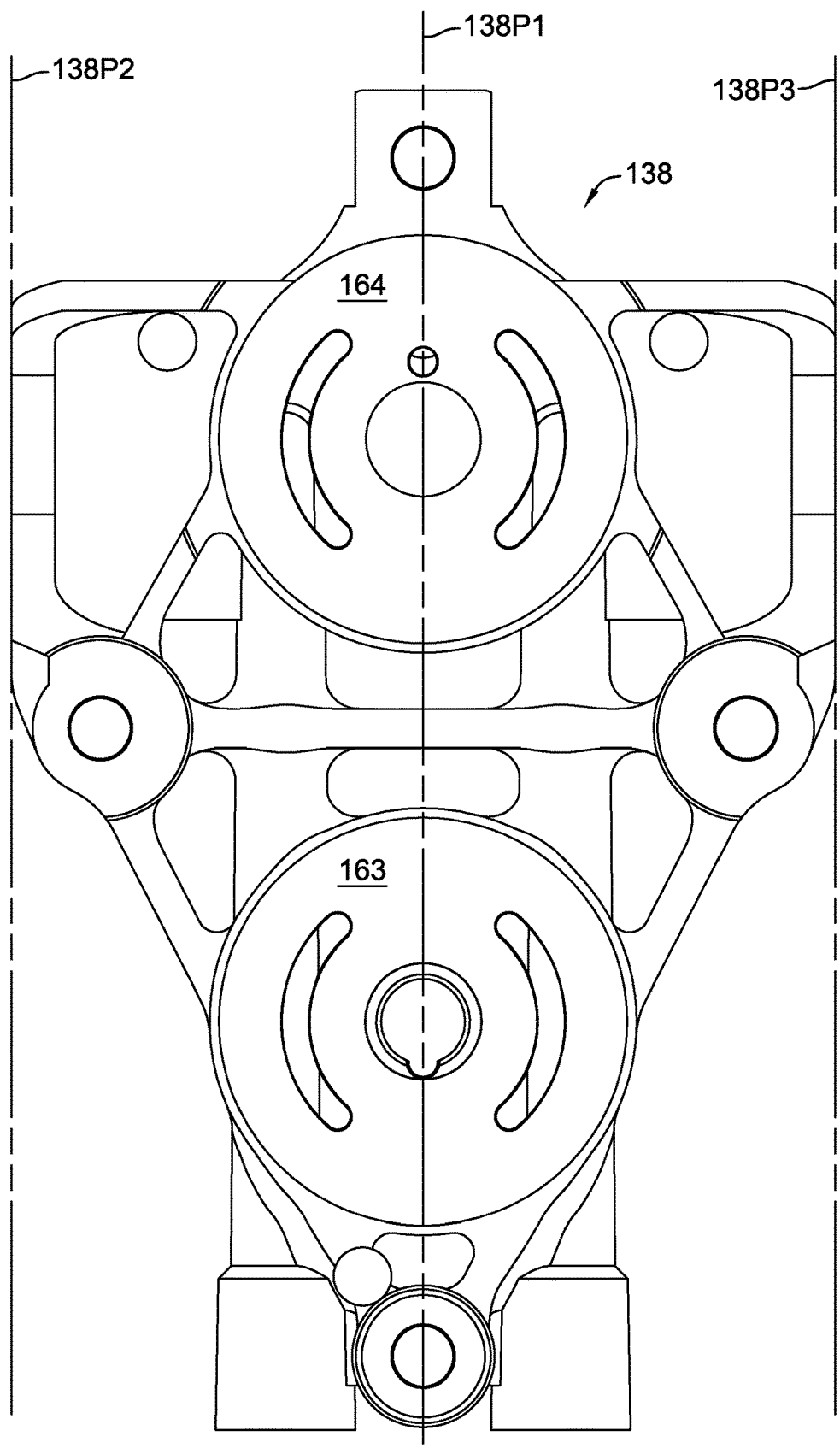
FIG. 12 is a plan view of an exemplary center section in accordance with the various embodiments disclosed herein.

Hydraulic mounting members such as center section 138 are generally known and take different shapes and sizes depending on factors such as pump input shaft and motor output shaft orientation, housing size, displacement of the rotating kits and the like. In the depicted embodiment, shown in, e.g., FIGS. 2 and 12, center section 138 has a first side on which the pump 136 and motor 140 are rotatably mounted on pump running surface 163 and motor running surface 164, respectively, and a second side, opposite to the first side, where elements such as clutch assembly 161 and certain drive gears, such as combination spur gears 101, are located. In the depicted embodiment, expansion tank 145 is positioned within an envelope formed by certain portions of center section 138, in order to provide for a more compact unit. More specifically, if one considers a first plane 138P2 adjacent a first edge of center section 138, and a second plane 138P3 parallel to first plane 138P2 and adjacent a second edge of center section 138, wherein the first plane 138P2 and second plane 138P3 are both parallel to a center plane 138P1 passing through the rotational axes of pump input shaft 134 and motor output shaft 148, one can see that the body of expansion tank 145 is fully disposed between first plane 138P2 and second plane 138P3, and expansion tank 145 is disposed adjacent to the second side of center section 138. It will be understood that this disclosure is not limited to the specific size or shape of center section 138, and the terms "side" or "edge" should not be read narrowly. Alternative center section designs, including right angle designs where one of the rotating kits may be disposed on a side or edge of the center section such that it is at a right angle to the other rotating kit, may be used in accordance with the teachings herein. The actual edges of center section 138 need not themselves form the two planes 138P2 and 138P3, but it is understood that planes 138P2 and 138P3 coincide with the furthermost edge of the hydraulic mounting member, and these two planes are parallel to one another and to center plane 138P1 that passes through the rotational axis of at least one of pump 136 and motor 140. As depicted in FIG. 12, all three planes extend out of the page.

Expansion tank 145 further comprises a neck 145*e* which extends upward to engage vent port 178 so that vent opening 145*a* of expansion tank 145 is in communication with vent 176 installed in the vent port 178 shown in FIG. 1. A siphon tube 145*c*, integrally formed with tank 145, has an external opening 145*b* located at a first portion of siphon tube 145*c* proximate to vent opening 145*a* and an internal opening 145*d* located at a second portion of siphon tube 145*c* proximate to the bottom of tank 145. The siphon tube external opening 145b is open to sump 120 while the siphon tube internal opening 145d is open to the internal volume of tank 145. A portion of expansion tank 145 is disposed adjacent to clutch assembly 161. In the depicted embodiment, siphon tube 145c follows the lower contour of neck 145e and curved profile 145f that extends downward from neck 145e to partially wrap around clutch shaft 167 and certain components of clutch assembly 161 without contacting them.

Sump 120 contains a volume of hydraulic fluid having some entrained air volume, and may also have an air volume at the top depending upon the fill level in transaxle 116. To improve hydraulic performance (e.g. to ensure motor 140 is immersed in hydraulic fluid) sump 120 will ideally be full and a small volume of hydraulic fluid will also be resident in expansion tank 145 at startup (siphon tube 145c providing fluid communication between these two volumes of hydraulic fluid). In general, entrainment of air can affect hydraulic performance and is caused by vigorous hydraulic fluid turbulence created by the moving components inside transaxle 116 during operation when an air volume is present in sump 120. As the hydraulic fluid (including any air volume and entrained air volume) in sump 120 heats up and expands, some of this fluid (including any air volume and entrained air volume) flows through siphon tube 145c into tank 145, thereby causing the tank fluid level 120a to rise while simultaneously forcing air out of tank 145 through vent 176, including air that was entrained. As transaxle 116 cools during lessened or ceased operations, the hydraulic fluid contracts, causing some of the hydraulic fluid volume in tank 145 to return to sump 120 by way of siphon tube 145c, thereby lowering the tank fluid level 120a. Thus, hydraulic fluid substantially devoid of entrained air is returned to sump 120. While the primary purpose of expansion tank 145 is to accommodate fluid expansion in transaxle 116, other benefits are realized, including the described reduction in the amount of entrained air after multiple heating cycles, and the use of a smaller volume of hydraulic fluid in transaxle 116, creating an operational cost savings. Flow of hydraulic fluid between sump 120 and expansion tank 145 ceases when transaxle 116 returns to ambient temperature or when a steady state operational temperature is achieved.

Figure 9:
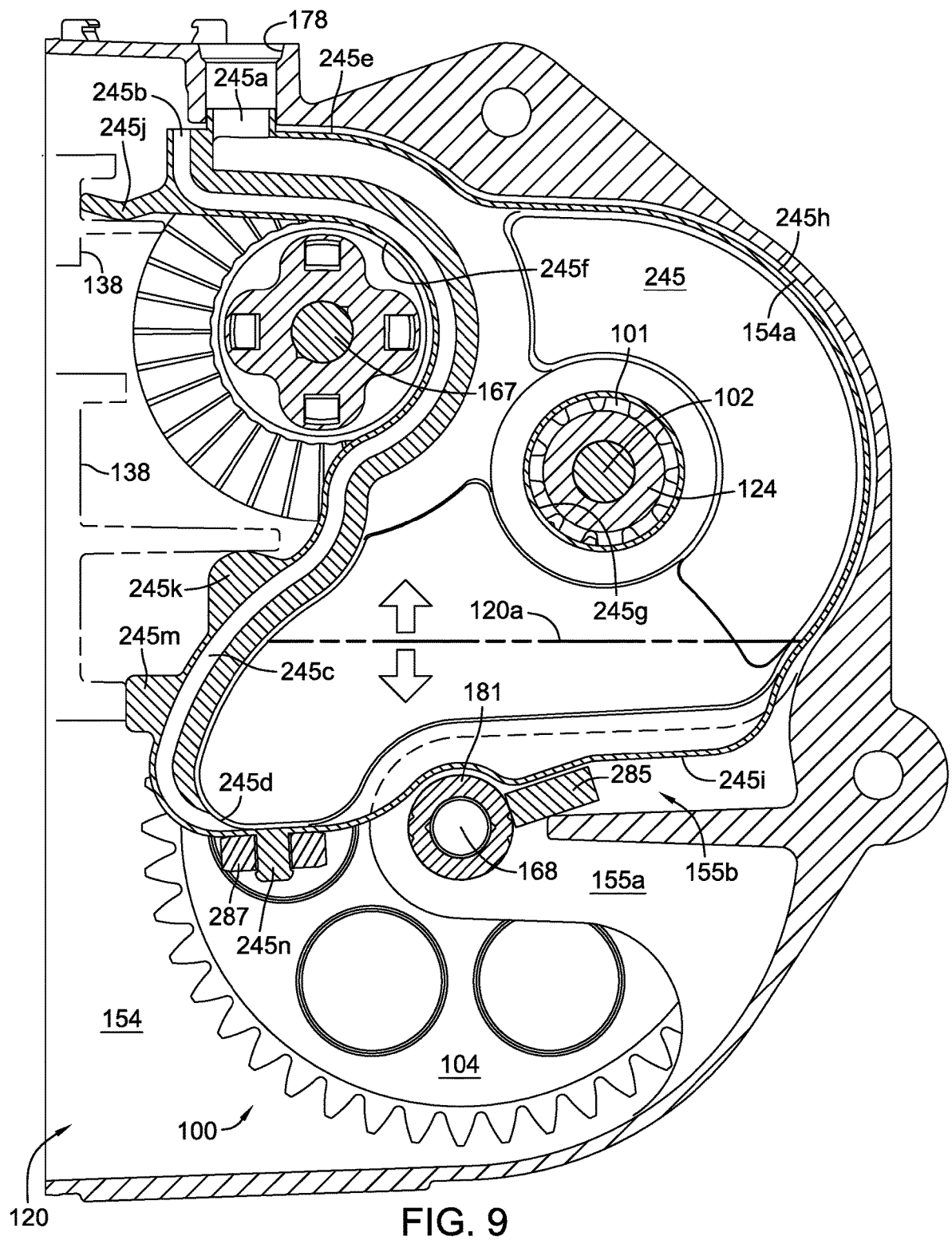
FIG. 9 is an alternative cross-sectional view of the portion of the hydraulic drive device shown in FIG. 7 along the line 8-8, showing certain expansion tank optional features of a further embodiment.

An alternative embodiment expansion tank 245 is shown in FIG. 9. Expansion tank 245 includes various optional features that may be employed in any combination to enhance function and/or performance of the basic expansion tank 145 described previously herein. The basic function of expansion tank 245 is the same as that of previously described expansion tank 145.

Due to fluid turbulence, shock, and vibration normally associated with the operation of a transmission or transaxle unit such as drive device 116, it is desirable to secure or restrain components such as expansion tank 245 to prevent damage and prolong the service life of drive device 116. The contour of rib 245i of expansion tank 245 is shaped to snap-fit over the axle support bushing 181. This snap-fit feature can improve ease of assembly and help restrain expansion tank 245 in its installed position.

Additional positioning features, such as projections 245j, 245k and 245m can be added to or proximate to the outer profile of siphon tube 245c. Projections 245j, 245k and 245m can be designed to be somewhat rigid or flexible, as needed, and can press against center section 138 when first housing member 152 is attached to second housing member 154 at assembly. The pressure exerted against the rigid center section 138 by projections 245j, 245k and 245m helps position and restrain tank 245. One or more flexible fins or projections (not shown) may also be added at any strategic location (or more than one location) along outer profile 245h of expansion tank 245 to help restrain a snap-fit tank, for example, while accommodating manufacturing variations in both expansion tank 245 and second housing member 154.

Jack shaft 102 can be secured to second housing member 154 so that neither jack shaft 102 nor spacer 124 can rotate. Then, the amount of clearance between transverse passage 245g (or passage 145g) and spacer 124 can be minimized so that this interface can serve as an effective tank restraint in combination with rib 245i (or rib 145i) to prevent or limit movement of expansion tank 245 (or tank 145) in all directions.

A magnet 285 can be located outside tank 245 adjacent to rib 245i to trap ferrous particles both inside and outside of expansion tank 245. This location allows for placing magnet 285 between lobes 155a in a pocket 155b created by the positioning of expansion tank 245 (or tank 145) adjacent to axle support structure 155. As illustrated in FIG. 9, magnet 285 does not require retention by a fastener or any other means and will magnetically attach itself to bushing 181 if bushing 181 is ferrous.

Alternatively or additionally, a magnet 287 can be attached to expansion tank 245 by means of integrally-formed barb or catch 245n (or other suitable means of attachment) proximate to the siphon tube opening 245d at the bottom of tank 245 to trap ferrous particles both inside and outside of expansion tank 245.

Figure 10:
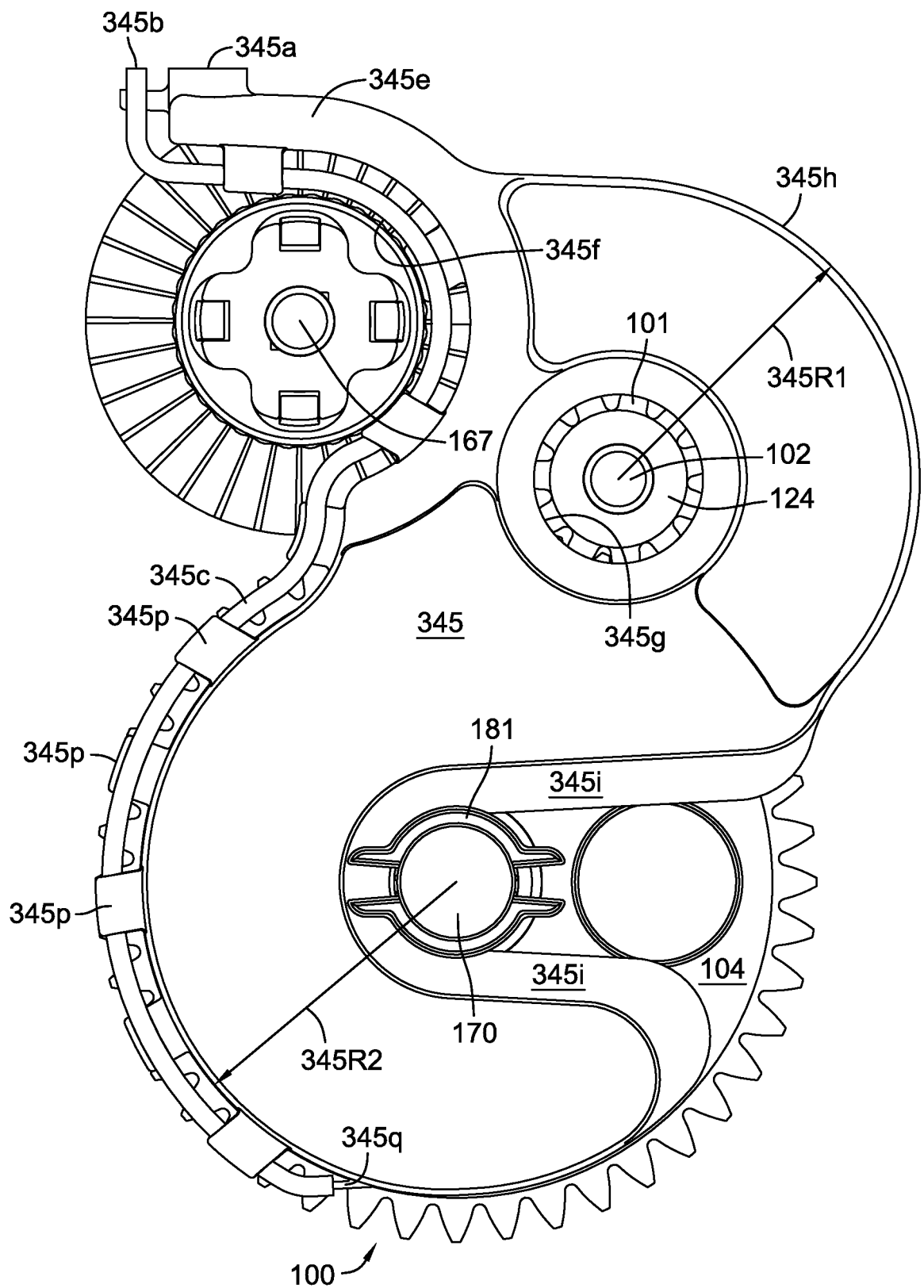
FIG. 10 is an alternative elevational view similar to FIG. 5 but illustrating an alternative expansion tank of another embodiment.
Figure 11:
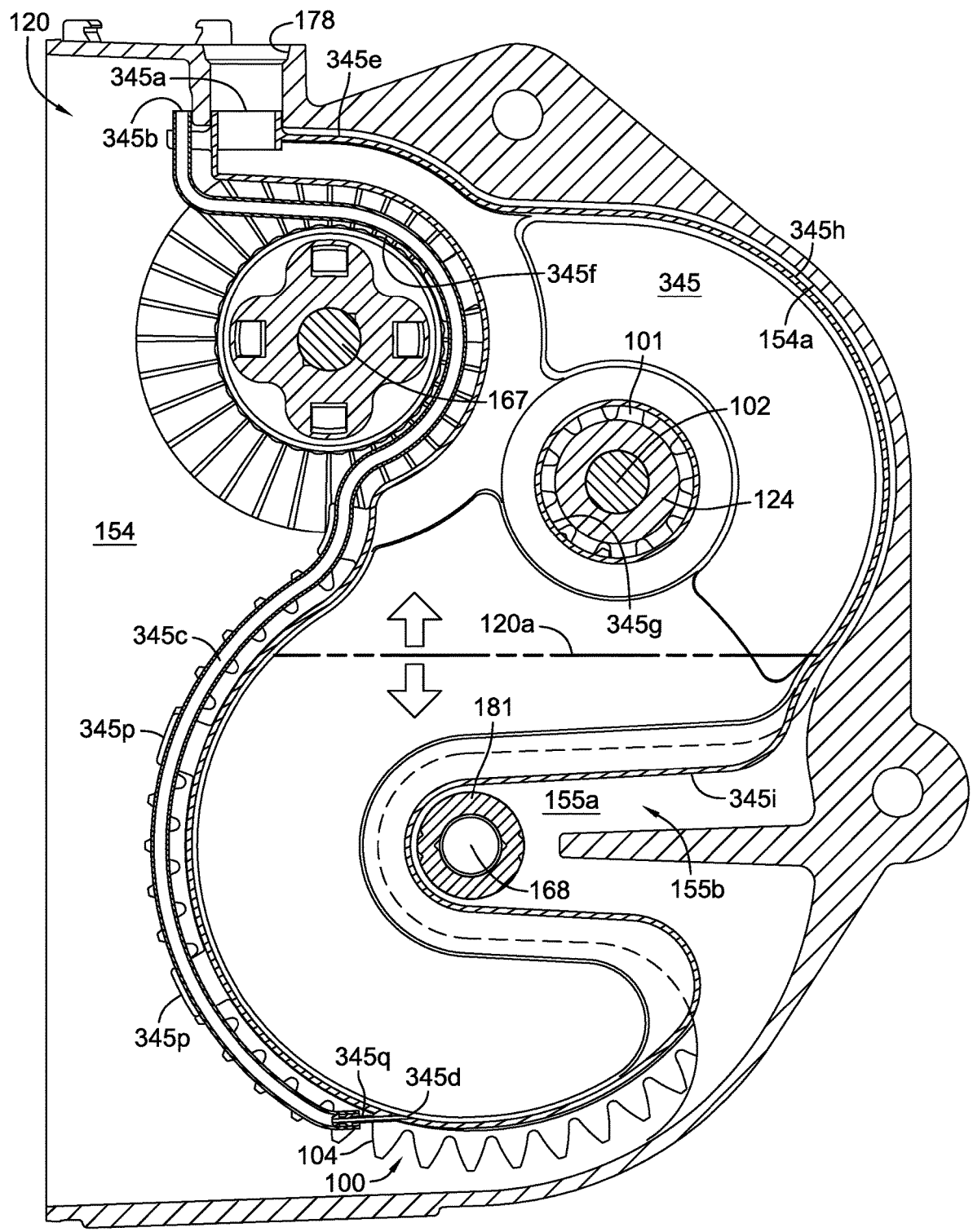
FIG. 11 is an alternative cross-sectional view similar to FIG. 8 but illustrating the alternative expansion tank of FIG. 10.

An alternative embodiment expansion tank 345 is shown in FIGS. 10 and 11. Expansion tank 345 may be housed in a drive device that is the same as or similar to drive device 116 described previously herein, and its basic function is the same as previously described for expansion tank 145. As before, expansion tank 345 has a transverse passage 345g, and a portion having a tank profile 345h that is similar to that of the internal wall of the housing, and a radius 345R1 that is greater than the root radius of reduction spur gears 101 (not shown in this view). Expansion tank 345, however, displaces a greater fluid volume of sump 120 and has a greater internal volume compared to expansion tank 145 due to the manner in which expansion tank 345 surrounds a greater portion of axle support bushing 181 as compared to expansion tank 145 and rib 145i. More specifically, as seen in FIG. 10, the lower portion of expansion tank 345 has a C-shaped section that extends around a portion of axle shafts 168, 170, and axle support bushing 181, and this C-shaped section has a radius 345R2 that is similar to the inside or root radius of spur gears 104 (i.e., to the base of the gear teeth). The radius 345R2 need not be identical to the root radius of spur gears 104, but having these radii be similar increases the optimal size of expansion tank 345. A rib 345i is formed on an external surface of expansion tank 345 and is the element proximate to and possibly contacting axle support bushing 181; if desired, the contour of rib 345i may be formed similar to rib 245i to snap-fit over axle support bushing 181. Also, one or more magnets may be applied to expansion tank 345 as described previously herein for expansion tank 245.

Expansion tank 345 includes a siphon tube 345c that is a separate component, as illustrated in FIGS. 10 and 11. Alternatively, expansion tank 345 could include an integrally-formed siphon tube similar to previously-described siphon tube 145c. As shown, the lower end of siphon tube 345c slides over a ribbed tubular projection 345q having a siphon passage 345d formed therethrough. Tube retainers

345p, illustrated as alternating projections formed on expansion tank 345, hold siphon tube 345c in place. These projections may take various forms as long as they adequately retain siphon tube 345c in place during operation of drive device 116.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A drive device for a vehicle, the drive device comprising:
    a housing having an internal wall structure forming an internal sump for hydraulic fluid;
    a transmission disposed in the internal sump;
    a first gear set and a second gear set disposed in the internal sump and driven by the transmission, the first gear set comprising a first spur gear and the second gear set comprising a second spur gear, wherein the first spur gear and the second spur gear share a first axis of rotation and a common root radius measured from the first axis of rotation;
    a first axle shaft driven by the first gear set and a second axle shaft driven by the second gear set; and
    an expansion tank disposed in the internal sump and separate from the housing, the expansion tank comprising a first portion having an outer profile having a radius that is greater than the common root radius of the first and second spur gears, wherein the expansion tank is disposed between the first gear set and the second gear set and is capable of receiving hydraulic fluid from the internal sump and discharging hydraulic fluid to the internal sump.

2. The drive device of claim 1, wherein
    the first spur gear is a first reduction gear, and the second spur gear is a second reduction gear;
    the first gear set further comprises a third spur gear engaged to and driven by the first reduction gear, and engaged to and driving the first axle shaft;
    the second gear set comprises a fourth spur gear engaged to and driven by the second reduction gear, and engaged to and driving the second axle shaft;
    the third spur gear and the fourth spur gear share a common second axis of rotation and share a common second root radius measured from the second axis of rotation; and
    the expansion tank comprises a second portion having a second outer profile having a generally circular arc length having a second radius, measured from the second axis of rotation, that is essentially equal to the second root radius.

3. The drive device of claim 1, further comprising a rib formed on an external surface of the expansion tank.

4. The drive device of claim 2, further comprising an axle bushing supporting the first axle shaft and the second axle shaft, wherein the rib is located adjacent to the axle bushing.

5. The drive device of claim 4, further comprising a pair of lobes extending from a portion of the internal wall structure of the housing, wherein each of the pair of lobes supports one of the first axle shaft or the second axle shaft, and wherein the rib is disposed between the pair of lobes.

6. The drive device of claim 4, wherein the expansion tank is snap fit to the axle bushing.

7. The drive device of claim 1, further comprising a transverse passage formed in the expansion tank, and the transmission comprises a jack shaft on which the first spur gear and the second spur gear are mounted, wherein the jack shaft extends through the transverse passage.

8. The drive device of claim 1 wherein a portion of the internal wall structure of the housing has an inner profile, and the outer profile of the first portion of the expansion tank essentially matches the inner profile of the portion of the internal wall structure of the housing.

9. A drive device for a vehicle, the drive device comprising:
    a housing having an internal wall structure comprising a plurality of internal walls forming an internal sump for hydraulic fluid;
    a transmission disposed in the internal sump;
    at least one gear driven by the transmission and having a first axis of rotation, wherein the at least one gear includes a root radius measured from the first axis of rotation, and the at least one gear is disposed adjacent to one of the plurality of internal walls of the housing; and
    an expansion tank disposed in the internal sump and separate from the housing, wherein the expansion tank is capable of receiving hydraulic fluid from the internal sump and discharging hydraulic fluid into the internal sump, and the expansion tank comprises a first arcuate portion having a tank radius measured from the first axis of rotation that is substantially similar to the root radius of the at least one gear.

10. The drive device of claim 9, wherein the at least one gear is disposed between the expansion tank and the at least one of the plurality of internal walls of the housing.

11. The drive device of claim 9, wherein a portion of the internal wall structure of the housing has an inner profile, and the first arcuate portion of the expansion tank has an outer profile that essentially matches the inner profile of the portion of the internal wall structure of the housing.

12. The drive device of claim 9, further comprising a transverse passage formed in the expansion tank, and the transmission comprises at least one shaft on which a gear is mounted, and the at least one shaft extends through the transverse passage.

13. The drive device of claim 9, wherein the expansion tank further comprises a lower curved portion forming a slot, and an axle shaft extends into the slot.

14. The drive device of claim 13, further comprising an axle bushing supporting the axle shaft, and the expansion tank is snap fit to the axle bushing.

15. A drive device for a vehicle, the drive device comprising:
    a housing comprising a plurality of walls forming an internal sump for hydraulic fluid;
    a transmission disposed in the internal sump, the transmission comprising at least one gear;
    an expansion tank disposed in the internal sump adjacent to the at least one gear and separate from the housing, the expansion tank comprising an external surface, and a rib formed on the external surface of the expansion tank, wherein the rib engages a structure inside the internal sump to locate the expansion tank and prevent the expansion tank from contacting the at least one gear, wherein the expansion tank is capable of receiving hydraulic fluid from the internal sump and discharging hydraulic fluid into the internal sump.

16. The drive device of claim 15, further comprising an external siphon tube fluidly connected to a lower tubular member extending from an outer surface of the expansion tank, the external siphon tube having a first portion open to the internal sump and disposed adjacent to a top portion of the expansion tank and a second portion connected to the expansion tank.

17. The drive device of claim 16, further comprising a plurality of tube retainers disposed on the external surface of the expansion tank to attach the external siphon tube to the expansion tank.

18. The drive device of claim 15, further comprising a siphon tube integrally formed with the expansion tank and having a first portion open to the internal sump and disposed adjacent to a top portion of the expansion tank and a second portion connected to the expansion tank.

19. The drive device of claim 15, wherein a portion of the expansion tank has an outer profile, and a portion of the plurality of walls of the housing has an inner profile that essentially matches the outer profile of the expansion tank.

20. The drive device of claim 15, wherein the transmission comprises a hydraulic mounting member having a first edge and a second edge opposite to the first edge, and the expansion tank is disposed between a first plane formed by the first edge of the hydraulic mounting member and a second plane, parallel to the first plane, and formed by the second edge of the hydraulic mounting member.

* * * * *